US011838660B2

(12) United States Patent
Itano et al.

(10) Patent No.: US 11,838,660 B2
(45) Date of Patent: Dec. 5, 2023

(54) APPARATUS, SYSTEM, AND MOVABLE BODY

(71) Applicant: CANON KABUSHIKI KAISHA, Tokyo (JP)

(72) Inventors: Tetsuya Itano, Kanagawa (JP); Tatsuya Ryoki, Kanagawa (JP); Yu Arishima, Kanagawa (JP); Taro Muraki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 17/586,243

(22) Filed: Jan. 27, 2022

(65) Prior Publication Data

US 2022/0247947 A1 Aug. 4, 2022

(30) Foreign Application Priority Data

Feb. 4, 2021 (JP) ................................. 2021-016456

(51) Int. Cl.
*H04N 25/671* (2023.01)
*H04N 25/75* (2023.01)
*H04N 25/60* (2023.01)

(52) U.S. Cl.
CPC ........... *H04N 25/671* (2023.01); *H04N 25/60* (2023.01); *H04N 25/75* (2023.01)

(58) Field of Classification Search
CPC ...... H04N 25/60; H04N 25/671; H04N 25/68; H04N 25/75; H04N 25/76; H04N 25/78
See application file for complete search history.

(56) References Cited

U.S. PATENT DOCUMENTS

| 5,508,740 A * | 4/1996 | Miyaguchi ............ H01L 31/024 348/E5.025 |
| 2007/0203481 A1* | 8/2007 | Gregg ................ A61B 18/1233 606/34 |
| 2018/0097960 A1* | 4/2018 | Ochiai ............... H04N 1/00978 |
| 2020/0244907 A1* | 7/2020 | Ueno ................... H04N 25/778 |

FOREIGN PATENT DOCUMENTS

| JP | 2004072253 A | 3/2004 |
| JP | 2018056970 A | 4/2018 |

* cited by examiner

*Primary Examiner* — Lin Ye
*Assistant Examiner* — Chriss S Yoder, III
(74) *Attorney, Agent, or Firm* — CANON U.S.A., INC. IP Division

(57) ABSTRACT

Since a failure related to an output from a sensor is not detected from an image signal and a failure of the sensor is not detected from an output from the sensor in a system including the sensor for abnormality detection, it is not possible to perform the abnormality detection and to indicate the abnormality to the outside of the system.
An apparatus includes a pixel area including multiple pixels, multiple sensors, a processing unit that compares signals based on outputs from the multiple sensors with each other, an output unit that outputs information based on a result of comparison.

30 Claims, 5 Drawing Sheets

APPARATUS, SYSTEM, AND MOVABLE BODY

BACKGROUND

Field of the Disclosure

The aspect of the embodiments relates to an apparatus, a system, and a movable body using the system.

Description of the Related Art

A photoelectric conversion apparatus is disclosed in Japanese Patent Laid-Open No. 2018-56970 which includes a temperature sensor that measures the temperature of the photoelectric conversion apparatus to determine whether the temperature of the photoelectric conversion apparatus is within an operable temperature range.

The photoelectric conversion apparatus described in Japanese Patent Laid-Open No. 2018-56970 includes the temperature sensor and is capable of detecting a state in which the temperature of the photoelectric conversion apparatus is not within a temperature range in which the photoelectric conversion apparatus normally operates (hereinafter referred to as a normally operable temperature range) as an abnormal state through the temperature measurement with the temperature sensor.

For example, when the temperature sensor sticks to output corresponding to the normally operable temperature range if any failure occurs in the temperature sensor or on a path from which the output from the temperature sensor is read out, it is difficult to detect the failure concerning the output from the temperature sensor from an image signal. Since it is difficult to detect any failure from the output from the temperature sensor, detection of abnormality is made difficult.

A photoelectric conversion apparatus described in Japanese Patent Laid-Open No. 2004-72253 includes two temperature sensors near output amplifiers and drives the low-temperature output amplifier or alternately drives the output amplifiers to suppress heat generation. However, a case is not discussed in which either of the two temperature sensors fails or malfunctions.

SUMMARY OF THE DISCLOSURE

According to an embodiment of the disclosure, an apparatus includes a pixel area including a plurality of pixels, a plurality of sensors, a processing unit that compares signals based on outputs from the plurality of sensors with each other, an output unit that outputs information based on a result of comparison.

According to another embodiment of the disclosure, a system includes an apparatus that includes a pixel area including a plurality of pixels and a plurality of sensors, a processing unit that compares signals with each other, which are output from the apparatus and which are based on outputs from the plurality of sensors, and an output unit that outputs information based on a result of comparison.

According to another embodiment of the present disclosure, a substrate is laminated on another substrate including a pixel area including a plurality of pixels. The substrate includes a plurality of sensors, a processing unit that compares signals based on outputs from the plurality of sensors with each other, and an output unit that outputs information based on a result of comparison.

According to another embodiment of the present disclosure, a substrate is laminated on a first substrate that includes a pixel area including a plurality of pixels and a first sensor. The substrate includes a processing unit that compares a signal based on an output from the first sensor and an output unit that outputs information based on a result of comparison.

Further features of the disclosure will become apparent from the following description of exemplary embodiments with reference to the attached drawings.

DESCRIPTION OF THE EMBODIMENTS

A photoelectric conversion apparatus in embodiments of the present disclosure will herein be described with reference to the drawings.

Although an imaging apparatus is mainly described as an example of the photoelectric conversion apparatus to which the present disclosure is applicable in the embodiments described below, the application of the respective embodiments is not limited to the imaging apparatus. For example, the embodiments are applicable to, for example, a ranging apparatus (an apparatus for distance measurement using focus detection or Time of Flight (TOF) or the like) and a photometric apparatus (an apparatus for measurement of the quantity of incident light or the like).

First Embodiment

A first embodiment of the present disclosure will now be described with reference to FIG. 1 and FIG. 2.

Figure 1:
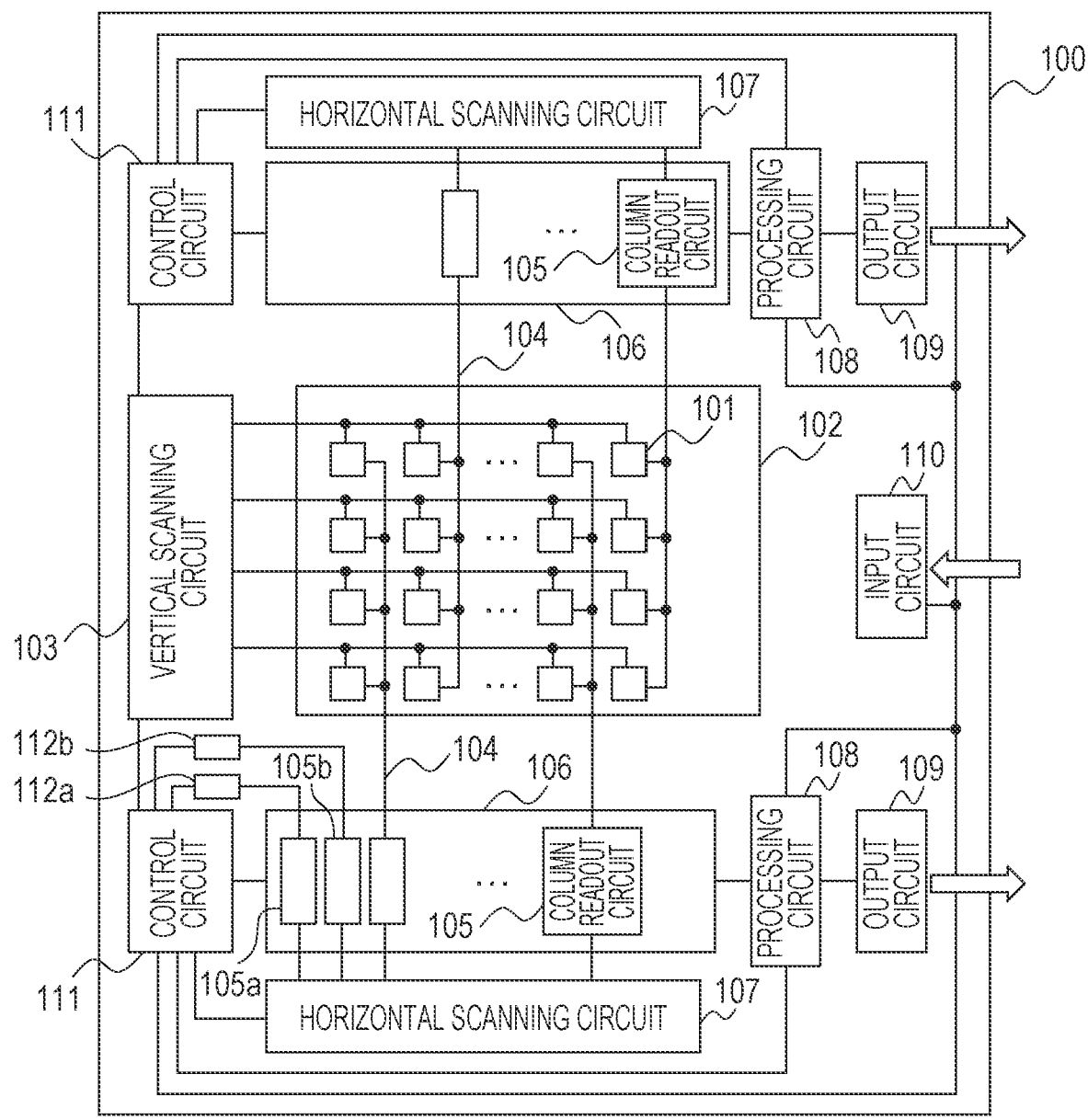
FIG. 1 is a diagram schematically illustrating a photoelectric conversion apparatus according to a first embodiment.

FIG. 1 is a diagram schematically illustrating a photoelectric conversion apparatus according to the first embodiment. A photoelectric conversion apparatus 100 of the first embodiment includes a pixel area 102, a vertical scanning circuit 103, column readout circuits 105, column circuit arrays 106, horizontal scanning circuits 107, processing circuits 108, output circuits 109, an input circuit 110, control circuits 111, and a temperature sensor 112.

Multiple pixels 101 are placed in an array pattern in the pixel area 102. Pixel signal lines 104 that extend in a column direction (the longitudinal direction in FIG. 1) are placed for the respective lines in the pixel area 102. Each pixel signal line 104 is connected to the respective pixels arranged in the column direction for each column and forms a common signal line that outputs electric charge occurring in the pixels as pixel signals.

The number of the pixels composing the pixel area 102 is not particularly limited. For example, the pixels of several thousand lines×several thousand columns may compose the pixel area 102, as in a common digital camera, or multiple pixels arranged in one line or one column may compose the pixel area 102.

The vertical scanning circuit 103 selectively drives the pixel line in the pixel area 102.

The pixel signals read out from the pixels 101 are supplied to the column readout circuits 105 arranged for the respective columns through the pixel signal lines 104. The column readout circuits 105 are arranged in each column circuit array 106.

The horizontal scanning circuit 107 transfers signals based on the pixel signals held in the column circuit array 106 to the processing circuit 108. The pixel signals are supplied to an imaging system (not illustrated) through the output circuit 109.

The input circuit 110 receives a control signal from the outside of the photoelectric conversion apparatus and supplies the control signal to the processing circuits 108 and the control circuits 111.

The control circuit 111 controls driving of the entire photoelectric conversion apparatus.

The column readout circuit 105 may include an analog-to-digital (AD) conversion circuit that converts the pixel signals, which are analog signals, into digital signals, a correlated double sampling (CDS) circuit, and/or an amplifier unit. In the first embodiment, the pixel signals are subjected to AD conversion in the column readout circuits 105 and are transferred to the processing circuit 108 as the digital signals. The pixel signals are further supplied to a signal processing circuit outside the photoelectric conversion apparatus from the output circuit 109 after being subjected to digital processing in the processing circuit 108. Here, a digital output method, such as a low voltage differential signaling (LVDS) method, is used for the output. The driving of the entire photoelectric conversion apparatus or part of the photoelectric conversion apparatus may be controlled via the processing circuit 108 and the control circuit 111 depending on the result of processing in the processing circuit 108.

A temperature sensor 1 (112a) and a temperature sensor 2 (112b) are placed outside the pixel area 102.

Although the temperature sensor using PN junction of a diode or a bipolar transistor is commonly used, the temperature sensor is not limited to this.

An output from the temperature sensor 112a is subjected to the AD conversion in a column readout circuit 105a and an output from the temperature sensor 112b is subjected to the AD conversion in a column readout circuit 105b. The outputs from the temperature sensors subjected to the AD conversion are compared with each other in the processing circuit 108, which is a processing unit.

If a difference exceeding a predetermined amount is detected between the output from the temperature sensor 112a and the output from the temperature sensor 112b in the comparison in the processing circuit 108, information is output from the output circuit 109. For example, a period during which warning information is output is provided at the beginning of image data output from the output circuit 109. A digital value zero (0) is output if the difference exceeding the predetermined amount is not detected and a digital value one (1) is output if the difference exceeding the predetermined amount is detected.

The method of outputting the information is not limited to the above one and image output and information output may be separately performed. For example, the image signal may be output in the LVDS method and the information may be output at a high level or a low level from a terminal different from an LVDS output terminal.

Although the warning information is exemplified as the information that is output here, the information that is output is not limited to the warning information. Information indicating that the difference between the output from the temperature sensor 112a and the output from the temperature sensor 112b exceeds the predetermined amount may only be indicated.

If the difference exceeding the predetermined amount is detected in the comparison between the outputs from the temperature sensors in the processing circuit 108, the driving of the entire photoelectric conversion apparatus or part of the photoelectric conversion apparatus may be controlled via the control circuit 111, in addition to the output of the information from the output circuit 109.

For example, control may be performed so that a portion where a signal corresponding to high temperature is detected and which is related to the temperature sensors is driven with lower power. This achieves the benefit of reducing the probability of causing abnormal current and heat generation due to short-circuit of wiring or a failure of the transistor.

Figure 2:
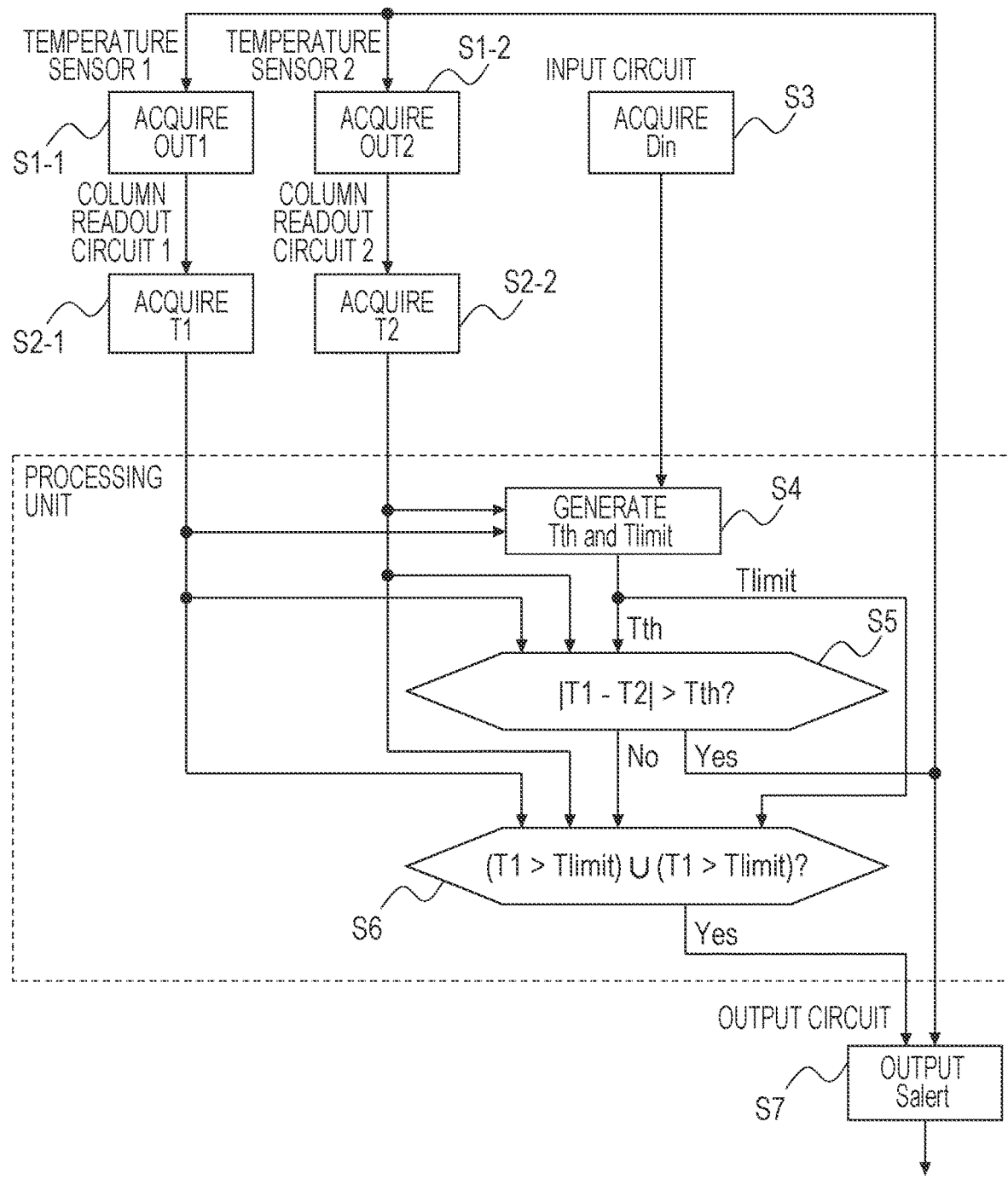
FIG. 2 is a flowchart illustrating an example of the operation of the photoelectric conversion apparatus according to the first embodiment.

FIG. 2 is a flowchart illustrating an example of the operation of the photoelectric conversion apparatus according to the first embodiment.

The operation to compare the signals based on the outputs from the multiple temperature sensors with each other and to output the information when the difference exceeding the predetermined amount is detected as the signal based on the result of the comparison is illustrated in FIG. 2. This operation can be performed by the temperature sensor 1, the temperature sensor 2, a column readout circuit 1, a column readout circuit 2, an input circuit, and a processing unit.

The operation will now be described in detail.

Referring to FIG. 2, in Step S1-1, the temperature sensor 1 acquires an output OUT1. In Step S1-2, the temperature sensor 2 acquires an output OUT2.

In Step S2-1, the column readout circuit 1 acquires a signal T1 based on the output OUT1 from the temperature sensor 1.

In Step S2-2, the column readout circuit 2 acquires a signal T2 based on the output OUT2 from the temperature sensor 2. The column readout circuit 1 and the column readout circuit 2 are different circuits and, in other words, the column readout circuit 1 and the column readout circuit 2 do not have a node sharing between them.

In Step S3, the input circuit acquires input data Din.

In Step S4, the processing unit generates a predetermined amount Tth.

The predetermined amount Tth can be generated based on at least one of the input data Din, the signals based on the outputs from the temperature sensors, information held in the processing circuit 108, which is the processing unit, and information held in a non-volatile memory in a chip. More specifically, the predetermined amount Tth is set based on an output difference caused by noise in the temperature sensors and the column readout circuits, an output difference that is caused by the difference of the positions where the temperature sensor 1 and the temperature sensor 2 are placed in the chip and that corresponds to the difference in temperature, or an output difference due to variation in manufacturing, which is caused by the difference of the positions where the temperature sensor 1 and the temperature sensor 2 are placed in the chip. Since the output difference is the amount depending on the temperature, the predetermined amount Tth may depend on the signals based on the outputs from the temperature sensors. The predetermined amount Tth is generated from the input data Din and the signals T1 and T2 based on the outputs from the temperature sensors in FIG. 2.

In the first embodiment, an amount-corresponding-to-temperature-upper-limit Tlimit is also generated in Step S4.

The amount-corresponding-to-temperature-upper-limit Tlimit can be generated based on at least one of the input data Din, the information held in the processing circuit 108, which is the processing unit, and the information held in the non-volatile memory in the chip.

In Step S5, the difference between the signal T1 and the signal T2, which are based on the outputs from the temperature sensor 1 and the temperature sensor 2, is compared with the predetermined amount Tth. If the difference between the signal T1 and the signal T2 exceeds the predetermined amount Tth (Yes in Step S5), it is determined that the temperature sensors or the column readout circuits reading out the outputs from the temperature sensors fail or malfunction and the operation goes to Step S7. In Step S7, information Salert is output from the output circuit 109.

At this time, the operation state of the temperature sensor 1 and the temperature sensor 2 may be changed. The change of the operation state means, for example, stop of supply of power supply voltage, stop of part of the operation, or reduction in power consumption during the operation. The operation of another circuit in the temperature sensors may be changed. Although a control path for changing the operation is not indicated in FIG. 2, the change of the operation may be performed via a control unit in the photoelectric conversion apparatus.

If the difference between the signal T1 and the signal T2 based on the outputs from the temperature sensors is smaller than or equal to the predetermined amount Tth (No in Step S5), the operation goes to Step S6. In Step S6, it is determined whether at least one of the signal T1 and the signal T2 based on the outputs from the temperature sensors exceeds the amount-corresponding-to-temperature-upper-limit Tlimit. If at least one of the signal T1 and the signal T2 based on the outputs from the temperature sensors exceeds the amount-corresponding-to-temperature-upper-limit Tlimit (Yes in Step S6), it is determined that the photoelectric conversion apparatus is not within a normally operable temperature range and the operation goes to Step S7. In Step S7, the information Salert is output from the output circuit 109. Step S6 may be performed regardless of the result of Step S5.

The information output from the output circuit 109 may be combination of the results in Step S5 and Step S6 or may be independent of the result in Step S5 and the result in Step S6.

Second Embodiment

A second embodiment of the present disclosure will now be described with reference to FIG. 3 and FIG. 4. A detailed description of the components common to the first embodiment is omitted herein and the difference from FIG. 1 and FIG. 2 is mainly described.

The photoelectric conversion apparatus described in the first embodiment is applicable to various photoelectric conversion systems. The photoelectric conversion system to which the present disclosure is applicable is exemplified by, for example, a camera, a camcorder, a monitoring camera, a copier, a facsimile, a mobile phone, an in-vehicle camera, and an observation satellite. In addition, a camera module including an optical system, such as a lens, and a photoelectric conversion apparatus is also an example of the photoelectric conversion system.

Figure 3:
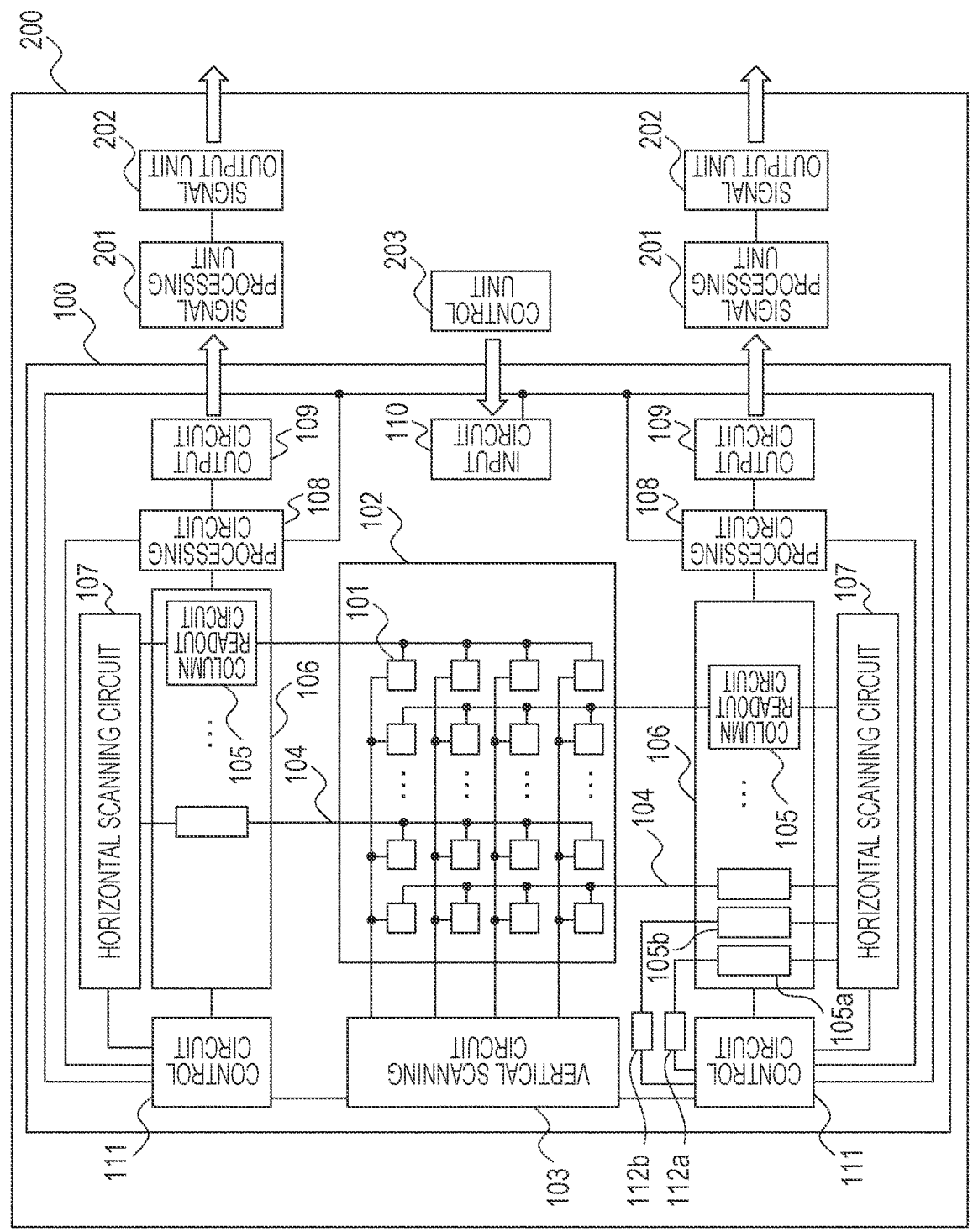
FIG. 3 is a diagram schematically illustrating a photoelectric conversion system according to a second embodiment.

FIG. 3 illustrates an example of the configuration of a photoelectric conversion system including the photoelectric conversion apparatus having the temperature sensor installed therein.

A photoelectric conversion system 200 in FIG. 3 differs from FIG. 1 in that the photoelectric conversion system 200 includes a signal processing unit 201, a signal output unit 202, and a control unit 203 outside the photoelectric conversion apparatus 100. The signal processing unit 201, the signal output unit 202, and the control unit 203 may be formed on the semiconductor substrate on which the photoelectric conversion apparatus 100 is provided or may be formed on a semiconductor substrate different from the semiconductor substrate on which the photoelectric conversion apparatus 100 is provided.

The output from the photoelectric conversion apparatus 100 is supplied to the outside (not illustrated) of the photoelectric conversion system 200 through the signal processing unit 201 and the signal output unit 202.

The signals T1 and T2 based on the output from the temperature sensor 112 in the photoelectric conversion apparatus 100 are compared with each other in the signal processing unit 201, which is the processing unit. If a difference exceeding a predetermined amount is detected in the comparison in the signal processing unit 201, information is output from the signal output unit 202.

If the difference exceeding the predetermined amount is detected in the comparison in the signal processing unit 201, driving of the entire photoelectric conversion apparatus 100 or part of the photoelectric conversion apparatus 100 may be controlled via the control unit 203, in addition to the output of the information from the signal output unit 202.

The pixel signals output from the pixels 101 in the photoelectric conversion apparatus 100 are subjected to a variety of correction and compression, if needed, in the signal processing unit 201 and the signal output unit 202 and are converted into image data.

The control unit 203 supplies the control signal to the input circuit 110 in the photoelectric conversion apparatus 100.

Figure 4:
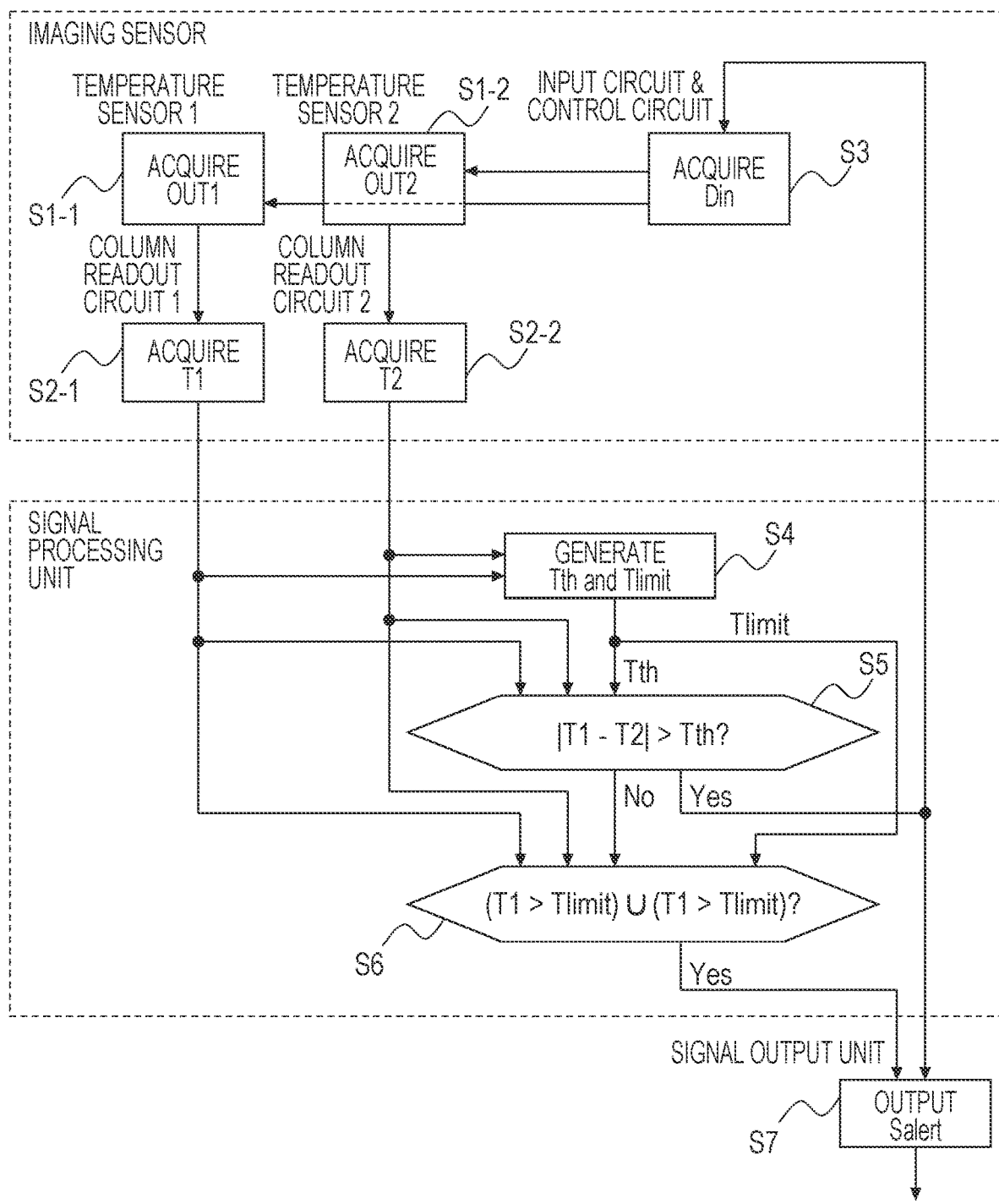
FIG. 4 is a flowchart illustrating an example of the operation of the photoelectric conversion system according to the second embodiment.

FIG. 4 is a flowchart illustrating an example of the operation of the photoelectric conversion system according to the second embodiment.

The operation is illustrated in FIG. 4 in which the signals based on the outputs from the multiple temperature sensors are compared with each other and the information when the difference exceeding the predetermined amount is detected is output as the signal based on the result of the comparison. This operation can be performed by the photoelectric conversion apparatus 100, the signal processing unit 201, and the signal output unit 202.

The operation will now be described in detail.

Referring to FIG. 4, in Step S1-1, the temperature sensor 1 acquires the output OUT1. In Step S1-2, the temperature sensor 2 acquires the output OUT2.

In Step S2-1, the column readout circuit 1 acquires the signal T1 based on the output OUT1 from the temperature sensor 1.

In Step S2-2, the column readout circuit 2 acquires the signal T2 based on the output OUT2 from the temperature sensor 2.

In Step S3, the input circuit acquires the input data Din.

In Step S4, the signal processing unit generates the predetermined amount Tth.

The predetermined amount Tth can be generated based on at least one of the input data Din, the signals based on the outputs from the temperature sensors, the information held in the processing circuit 108, which is the processing unit, and the information held in the non-volatile memory in the chip. The predetermined amount Tth may be generated using information input from the outside of the photoelectric conversion system.

In the second embodiment, the amount-corresponding-to-temperature-upper-limit Tlimit is also generated in Step S4.

The amount-corresponding-to-temperature-upper-limit Tlimit can be generated based on at least one of information held in the signal processing unit 201, which is the processing unit, and information held in a non-volatile memory in the imaging system.

The amount-corresponding-to-temperature-upper-limit Tlimit may be generated using the information input from the outside of the photoelectric conversion system.

In Step S5, the difference between the signal T1 and the signal T2 based on the outputs from the temperature sensor 1 and the temperature sensor 2 is compared with the predetermined amount Tth. If the difference between the signal T1 and the signal T2 exceeds the predetermined amount Tth (Yes in Step S5), it is determined that the temperature sensors or any of the column readout circuits reading out the outputs from the temperature sensors, the processing circuit 108, and the output circuit 109 fails or malfunctions and the operation goes to Step S7. In Step S7, the information Salert is output from the signal output unit 202.

At this time, the operation of the temperature sensor 1 and the temperature sensor 2 may be changed. The change of the operation means, for example, stop of supply of power supply voltage, stop of part of the operation, or reduction in power consumption during the operation. The operation of another circuit in the temperature sensors may be changed.

Although part of the control path for changing the operation is not indicated in FIG. 4, the change of the operation may be performed via a control unit outside the photoelectric conversion apparatus and the input circuit and the control circuit in the photoelectric conversion apparatus.

If the difference between the signal T1 and the signal T2 based on the outputs from the temperature sensors is smaller than or equal to the predetermined amount Tth (No in Step S5), the operation goes to Step S6. In Step S6, it is determined whether at least one of the signal T1 and the signal T2 based on the outputs from the temperature sensors exceeds the amount-corresponding-to-temperature-upper-limit Tlimit. If at least one of the signal T1 and the signal T2 based on the outputs from the temperature sensors exceeds the amount-corresponding-to-temperature-upper-limit Tlimit (Yes in Step S6), it is determined that the photoelectric conversion apparatus is not within the normally operable temperature range and the operation goes to Step S7. In Step S7, the information Salert is output from the signal output unit 202.

Step S6 may be performed regardless of the result of Step S5.

The information output from the signal output unit 202 may be combination of the results in Step S5 and Step S6 or may be independent of the result in Step S5 and the result in Step S6.

Third Embodiment

Figure 5A:
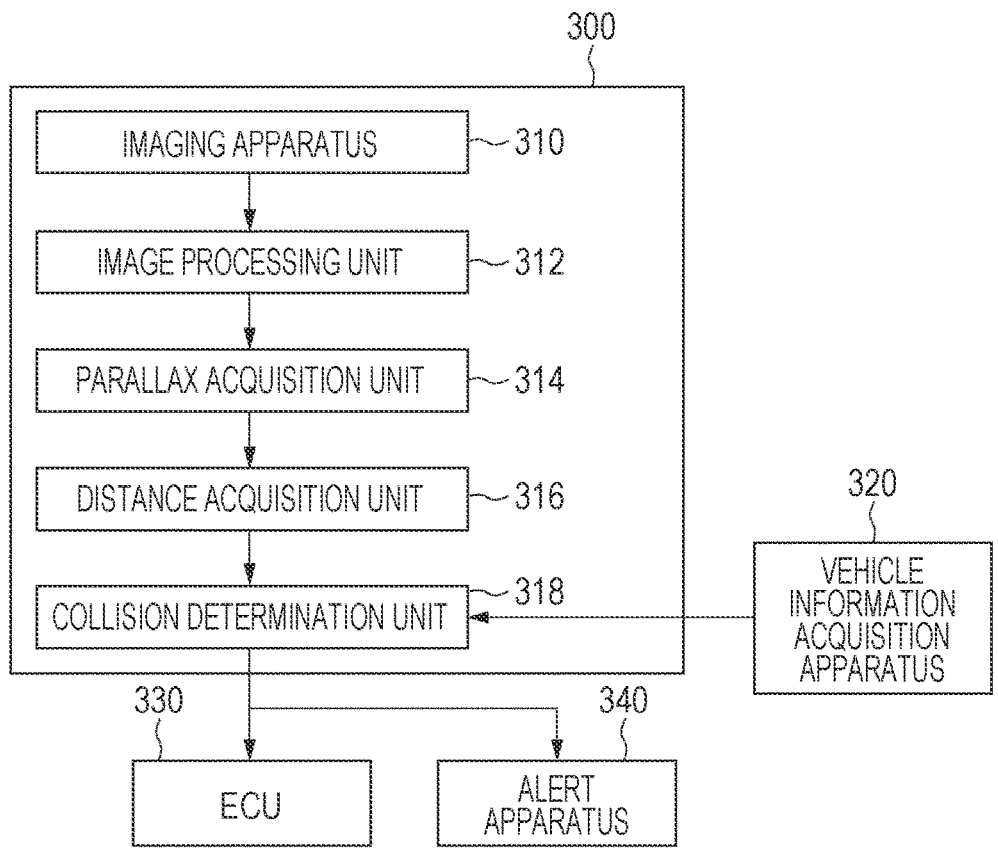
FIG. 5A and FIG. 5B are diagrams illustrating the configuration and the operation of a movable body.
Figure 5B:
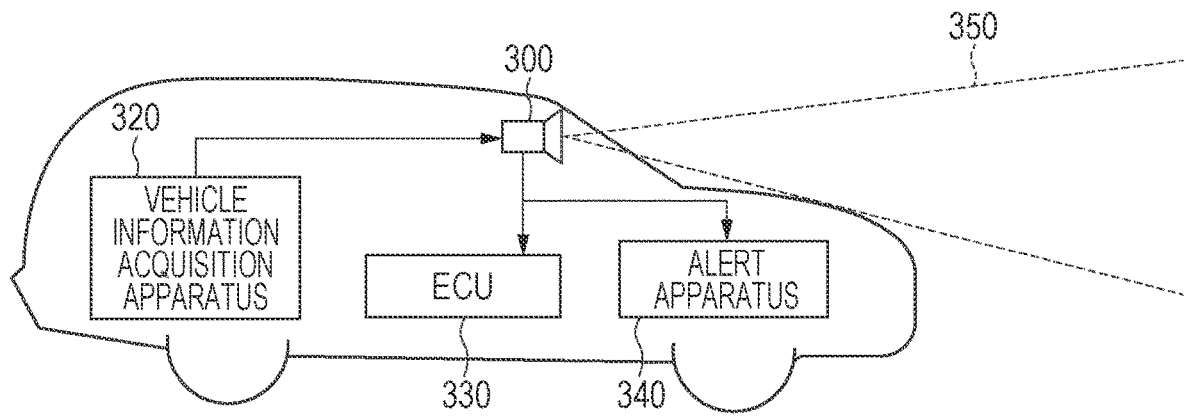

A photoelectric conversion system and a movable body of a third embodiment will now be described with reference to FIG. 5A and FIG. 5B. FIG. 5A and FIG. 5B illustrate the configurations of the photoelectric conversion system and the movable body, respectively, of the third embodiment.

FIG. 5A illustrates an example of a photoelectric conversion system for an in-vehicle camera. A photoelectric conversion system 300 includes an imaging apparatus 310. The imaging apparatus 310 is the photoelectric conversion apparatus (the imaging apparatus) described in any of the above embodiments. The photoelectric conversion system 300 includes an image processing unit 312 and a parallax acquisition unit 314. The image processing unit 312 performs image processing to multiple pieces of image data acquired by the imaging apparatus 310. The parallax acquisition unit 314 calculates the parallax (the phase difference between parallax images) from the multiple pieces of image data acquired by the photoelectric conversion system 300. The photoelectric conversion system 300 further includes a distance acquisition unit 316 and a collision determination unit 318. The distance acquisition unit 316 calculates the distance to a target object based on the calculated parallax. The collision determination unit 318 determines whether the possibility of collision exists based on the calculated distance. The parallax acquisition unit 314 and the distance acquisition unit 316 are examples of a distance information acquisition unit that acquires information about the distance to the target object. In other words, the distance information is information concerning the parallax, the amount of defocusing, the distance to the target object, and so on. The collision determination unit 318 may determine the possibility of collision using any of the distance information. The distance information acquisition unit may be realized by dedicated hardware or a software module. The distance information acquisition unit may be realized by, for example, a field programmable gate array (FPGA), an application specific integrated circuit (ASIC), or a combination of the above ones.

The photoelectric conversion system 300 is connected to a vehicle information acquisition apparatus 320 and is capable of acquiring vehicle information, such as a vehicle speed, a yaw rate, and a rudder angle. In addition, the photoelectric conversion system 300 is connected to an electronic control unit (ECU) 330. The ECU 330 is a control unit that outputs a control signal used to generate the braking force to the vehicle based on the result of the determination in the collision determination unit 318. Furthermore, the photoelectric conversion system 300 is connected to an alert apparatus 340 that puts out an alert to a driver based on the result of the determination in the collision determination unit 318. For example, when the possibility of collision is high as the result of the determination in the collision determination unit 318, the ECU 330 performs vehicle control to avoid the collision and reduce the damage through, for example, braking, release of the acceleration, or decrease of the output from the engine. The alert apparatus 340 issues the warning to a user by, for example, sounding the alert, such as sound, displaying alert information on the screen of a car navigation system or the like, or causing vibration in safety belts and/or the steering.

In the third embodiment, an image of a range around the vehicle, for example, ahead or behind the vehicle is captured by the photoelectric conversion system 300. The photoelectric conversion system when an image of a range ahead of the vehicle (an imaging range 350) is captured is illustrated in FIG. 5B. The vehicle information acquisition apparatus 320 issues an instruction to the photoelectric conversion system 300 or the imaging apparatus 310. It is possible to further improve the accuracy in ranging with the above configuration.

Although the example is described above in which the control is performed so as not to collide with another vehicle, the third embodiment is applicable to control in which automatic driving is performed while following another vehicle, control in which the automatic driving is performed so as not to run over a traffic lane, and so on. In addition, the photoelectric conversion system is not limitedly applied to the vehicle, such as an automobile, and is applicable to a movable body (moving apparatus), such as a ship or boat, an aircraft, or an industrial robot. Furthermore, the photoelectric conversion system is not limitedly applied to the movable body and is applicable to a device, such as Intelligent Transport Systems (ITS), which widely uses object recognition.

MODIFICATIONS

The present disclosure is not limited to the above embodiments and various modifications are available.

For example, an example in which the configuration of part of any of the embodiments is added to another embodiment and an example in which the configuration of part of any of the embodiments is replaced with the configuration of part of another embodiment are also included in the embodiments of the present disclosure.

The first and second embodiments described above are applicable to both a non-laminated photoelectric conversion apparatus and a laminated photoelectric conversion apparatus.

For example, when the laminated photoelectric conversion apparatus is used, two temperature sensors may be provided on a certain layer to compare the output signals from the two temperature sensors with each other or one temperature sensor may be provided on a pixel-side substrate and one temperature sensor may be provided on a circuit-side substrate to compare the output signals from the two temperature sensors with each other. The number of the temperature sensors provided on each substrate is not limited two. For example, two temperature sensors may be provided on each substrate to compare the output signals from the two temperature sensors on each substrate with each other or compare the output signals from the two temperature sensors on the respective substrates with each other. The number of the laminated substrates is not limited two. For example, the circuit may be separated to form a laminated structure of three or more layers.

Although the column circuit arrays, the horizontal scanning circuits, the processing circuits, the output circuits, and the control circuits are provided on the upper side and the lower side of the chip because the pixel signals are read out from both the upper side and the lower side of the chip in the photoelectric conversion apparatus described in the first and second embodiments, any of the circuits may be shared between the upper side and the lower side. For example, one processing circuit and one output circuit may be shared between the readout from the upper side of the chip and the readout from the lower side of the chip.

A configuration may be adopted in which the pixel signals are not read out from both the upper side and the lower side of the chip but are read out from either side of the chip.

Although the outputs from the temperature sensor 1 and the temperature sensor 2 are subjected to the AD conversion in the column readout circuits in the column circuit array arranged at the lower side of the pixel area, the outputs from the temperature sensor 1 and the temperature sensor 2 may be subjected to the AD conversion in the column readout circuits in the column circuit arrays arranged at the upper side and the lower side, respectively, of the pixel area. In this case, one processing circuit is shared between the upper side and the lower side of the pixel area.

The temperature sensor 112a and the temperature sensor 112b may each include the AD conversion circuit and the digital outputs from the temperature sensors may be compared with each other in the processing circuit 108, which is the processing unit.

The photoelectric conversion systems described in the second and third embodiments are examples of the photoelectric conversion system to which the photoelectric conversion apparatus is applicable. The photoelectric conversion system to which the photoelectric conversion apparatus of the present disclosure is applicable does not limitedly have the configuration illustrated in FIG. 3.

The embodiments described above are only exemplary embodiments to embody the present disclosure and the technical scope of the present disclosure should not be limitedly interpreted by the embodiments described above.

The present disclosure is embodied by various modes within the technical spirit and the major features thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-016456, filed Feb. 4, 2021, which is hereby incorporated by reference herein in its entirety.

What is claimed is:

1. An apparatus comprising:
a pixel area including a plurality of pixels;
a plurality of temperature sensors;
a processing circuit configured to compare signals based on outputs from the plurality of temperature sensors with each other; and
an output circuit configured to output information based on a result of comparison,
wherein, if the result of comparison indicates that a difference between the signals based on the outputs from the plurality of temperature sensors exceeds a predetermined value, the information is output using the output circuit and
wherein the predetermined value includes an output difference that is caused by a difference of positions where the plurality of temperature sensors is placed in the apparatus and that corresponds to a difference in temperature.

2. The apparatus according to claim 1,
wherein the predetermined value includes an output difference due to variation in manufacturing, which is caused by a difference of positions where the plurality of temperature sensors is placed in the apparatus.

3. The apparatus according to claim 1,
wherein the predetermined value includes an output difference caused by noise in an output circuit that reads out the outputs from the plurality of temperature sensors.

4. The apparatus according to claim 1, further comprising:
a setting circuit configured to set the predetermined value from an outside of the apparatus.

5. The apparatus according to claim 4,
wherein the setting circuit varies the predetermined value in accordance with the outputs from the plurality of temperature sensors.

6. The apparatus according to claim 1,
wherein, if the result of comparison indicates that the signal based on the output from any of the plurality of temperature sensors exceeds a predetermined range, the information is output using the output circuit.

7. The apparatus according to claim 6,
wherein the predetermined range is included in a range corresponding to a normally operable temperature range of the plurality of temperature sensors.

8. The apparatus according to claim 1,
wherein the outputs from the plurality of temperature sensors are output via at least part of an output circuit of signals generated in the pixels.

9. The apparatus according to claim 1,
wherein a first path with which a first temperature sensor, among the plurality of temperature sensors, is connected to the processing circuit and a second path with which a second temperature sensor, among the plurality of temperature sensors, is connected to the processing circuit do not have a common node.

10. The apparatus according to claim 1,
wherein the result of comparison is output via at least part of an output circuit of signals generated in the pixels.

11. The apparatus according to claim 1,
wherein an operation state of the apparatus is changed in accordance with the result of comparison.

12. The apparatus according to claim 1,
wherein the plurality of temperature sensors are circuits using diodes.

13. A system comprising:
a processing circuit configured to generate an image using a signal output from the apparatus according to claim 1.

14. A movable body comprising:
the system according to claim 13; and
a control circuit configured to control movement of the movable body using information output from the system.

15. A system comprising:
an apparatus configured to include a pixel area including a plurality of pixels and a plurality of temperature sensors;
a processing circuit configured to compare signals with each other, which are output from the apparatus and which are based on outputs from the plurality of temperature sensors; and
an output circuit configured to output information based on a result of comparison,
wherein, if the result of comparison indicates that a difference between the signals based on the outputs from the plurality of temperature sensors exceeds a predetermined value, the information is output using the output circuit and
wherein the predetermined value includes an output difference that is caused by a difference of positions where the plurality of temperature sensors is placed in the apparatus and that corresponds to a difference in temperature.

16. The system according to claim 15,
wherein, if the result of comparison indicates that a difference between the signals based on the outputs from the plurality of temperature sensors exceeds a predetermined value, the information is output using the output circuit.

17. The system according to claim 16, further comprising:
a setting circuit configured to set the predetermined value from an outside of the system.

18. The system according to claim 17,
wherein the setting circuit varies the predetermined value in accordance with the outputs from the plurality of temperature sensors.

19. The system according to claim 15,
wherein, if the result of comparison indicates that the signal based on the output from any of the plurality of temperature sensors exceeds a predetermined range, the information is output using the output circuit.

20. The system according to claim 19,
wherein the predetermined range is included in a range corresponding to a normally operable temperature range of the apparatus.

21. The system according to claim 15,
wherein an operation state of the system is changed in accordance with the result of comparison.

22. The system according to claim 15, further comprising:
a processing circuit configured to generate an image using a signal output from the apparatus.

23. A first substrate configured to be laminated on a second substrate, the second substrate including a pixel area including a plurality of pixels, the first substrate comprising:
a plurality of temperature sensors;
a processing circuit configured to compare signals based on outputs from the plurality of temperature sensors with each other; and
an output circuit configured to output information based on a result of comparison,
wherein, if the result of comparison indicates that a difference between the signals based on the outputs from the plurality of temperature sensors exceeds a predetermined value, the information is output using the output circuit and
wherein the predetermined value includes an output difference that is caused by a difference of positions where the plurality of temperature sensors is placed in the apparatus and that corresponds to a difference in temperature.

24. A first substrate configured to be laminated on a second substrate, the second substrate including a pixel area including a plurality of pixels and a first temperature sensor of a plurality of temperature sensors, the first substrate comprising:
a second temperature sensor of the plurality of temperature sensors;
a processing circuit configured to compare signals based on outputs from the plurality of temperature sensors with each other; and
an output circuit configured to output information based on a result of comparison,
wherein, if the result of comparison indicates that a difference between the signals based on the outputs from the plurality of temperature sensors exceeds a predetermined value, the information is output using the output circuit and
wherein the predetermined value includes an output difference that is caused by a difference of positions where the plurality of temperature sensors is placed in the apparatus and that corresponds to a difference in temperature.

25. An apparatus comprising:
a pixel area including a plurality of pixels;
a plurality of temperature sensors;
a processing circuit configured to compare signals based on outputs from the plurality of temperature sensors with each other; and
an output circuit configured to output information based on a result of comparison, wherein if the result of comparison indicates that a difference between the signals based on the outputs from the plurality of temperature sensors exceeds a predetermined value, the information is output using the output circuit and wherein the predetermined value includes an output difference due to variation in manufacturing, which is caused by a difference of positions where the plurality of temperature sensors is placed in the apparatus.

26. An apparatus comprising:

a pixel area including a plurality of pixels;

a plurality of temperature sensors;

a processing circuit configured to compare signals based on outputs from the plurality of temperature sensors with each other; and an output circuit configured to output information based on a result of comparison, wherein if the result of comparison indicates that a difference between the signals based on the outputs from the plurality of temperature sensors exceeds a predetermined value, the information is output using the output circuit and wherein the predetermined value includes an output difference caused by noise in an output circuit that reads out the outputs from the plurality of temperature sensors.

27. An apparatus comprising:

a pixel area including a plurality of pixels;

a plurality of temperature sensors;

a processing circuit configured to compare signals based on outputs from the plurality of temperature sensors with each other; and an output circuit configured to output information based on a result of comparison, wherein if the result of comparison indicates that a difference between the signals based on the outputs from the plurality of temperature sensors exceeds a predetermined value, the information is output using the output circuit and wherein further comprising a setting circuit configured to set the predetermined value from an outside of the apparatus.

28. A system comprising:

an apparatus configured to include a pixel area including a plurality of pixels and a plurality of temperature sensors;

a processing circuit configured to compare signals with each other, which are output from the apparatus and which are based on outputs from the plurality of temperature sensors; and an output circuit configured to output information based on a result of comparison, wherein if the result of comparison indicates that a difference between the signals based on the outputs from the plurality of temperature sensors exceeds a predetermined value, the information is output using the output circuit and wherein the predetermined value includes an output difference caused by noise in an output circuit that reads out the outputs from the plurality of temperature sensors.

29. A first substrate configured to be laminated on a second substrate, the second substrate including a pixel area including a plurality of pixels, the first substrate comprising:

a plurality of temperature sensors;

a processing circuit configured to compare signals based on outputs from the plurality of temperature sensors with each other; and an output circuit configured to output information based on a result of comparison, wherein if the result of comparison indicates that a difference between the signals based on the outputs from the plurality of temperature sensors exceeds a predetermined value, the information is output using the output circuit and wherein the predetermined value includes an output difference caused by noise in an output circuit that reads out the outputs from the plurality of temperature sensors.

30. A first substrate configured to be laminated on a second substrate, the second substrate including a pixel area including a plurality of pixels and a first temperature sensor of a plurality of temperature sensors, the first substrate comprising:

a second temperature sensor of the plurality of temperature sensors a processing circuit configured to compare signals based on outputs from the plurality of temperature sensors with each other; and an output circuit configured to output information based on a result of comparison, wherein if the result of comparison indicates that a difference between the signals based on the outputs from the plurality of temperature sensors exceeds a predetermined value, the information is output using the output circuit and wherein the predetermined value includes an output difference caused by noise in an output circuit that reads out the outputs from the plurality of temperature sensors.

* * * * *